United States Patent
Nakaoka et al.

[11] Patent Number: 5,251,491
[45] Date of Patent: Oct. 12, 1993

[54] METHOD OF AND APPARATUS FOR MEASURING A TENSION OF GRID ELEMENT

[75] Inventors: Susumu Nakaoka; Sadao Kozuka; Tomoyuki Kurihara, all of Aichi, Japan

[73] Assignee: Sony Corporation, Tokyo, Japan

[21] Appl. No.: 766,507

[22] Filed: Sep. 27, 1991

[30] Foreign Application Priority Data
Sep. 28, 1990 [JP] Japan .................. 2-259571

[51] Int. Cl.$^5$ .............................. G01L 5/04
[52] U.S. Cl. .................. 73/862.41; 73/579; 73/671; 73/655
[58] Field of Search .......... 73/581, 579, 862.41, 73/657, 655, 671

[56] References Cited
U.S. PATENT DOCUMENTS

| | | |
|---|---|---|
| 3,394,587 | 7/1968 | Freeman . |
| 4,393,725 | 7/1983 | Satterfield ............. 73/862.41 |
| 4,471,660 | 9/1984 | Bodge ..................... 73/655 |
| 4,692,615 | 9/1987 | Mensah et al. ........... 73/862.41 |
| 4,780,641 | 10/1988 | Hashiba et al. ........... 313/269 |
| 4,833,928 | 5/1989 | Luukkala et al. ........... 73/655 |

FOREIGN PATENT DOCUMENTS

| | | |
|---|---|---|
| 0059567 | 9/1982 | European Pat. Off. . |
| 0226396 | 6/1987 | European Pat. Off. . |
| 0191036 | 8/1988 | Japan ..................... 73/862.41 |

*Primary Examiner*—Hezron E. Williams
*Assistant Examiner*—Nashmiya Ashraf
*Attorney, Agent, or Firm*—Hill, Steadman & Simpson

[57] ABSTRACT

A method of and apparatus for measuring a tension by the steps of vibrating a measured object of a line- or belt-shaped configuration by the flow of air from an air nozzle so that the measured object is resonated, counting the number of vibrations of the measured object per second by the radiation of a laser light emitted from a very small distance measuring device, and calculating a resonance frequency of the measured object from the number of the vibrations to thereby obtain a tension of the measured object.

13 Claims, 10 Drawing Sheets

METHOD OF AND APPARATUS FOR MEASURING A TENSION OF GRID ELEMENT

BACKGROUND OF THE INVENTION

1. Field of the Invention

The present invention generally relates to methods for measuring a tension strength and, more particularly, is directed to a method of and apparatus for measuring a tension of a rectangular-shaped measured object such as a grid element constructing a color selecting electrode of a cathode ray tube.

2. Description of the Related Art

Generally, in the process for assembling the color selecting electrode of a cathode ray tube, in order to control the quality of the color selecting electrode, etc., a tension of the grid element constructing the grid assembly is measured after the grid assembly is stretched to the frame of the color selecting electrode.

In a method of measuring a tension according to the prior art, the color selecting electrode is held on a vibrator table. Then, the grid element of the color selecting electrode held on the vibrator table is vibrated by a vibrator, the frequency of which can be freely selected and a resonance point produced on the grid element in the course of the vibration of the grid element is checked visually. During this process, when a resonance point appears, for example, at the center of the grid element, the frequency of vibration is read out and the thus readout frequency is determined as the tension of the grid element. Then, by using the user terminal or the like, the read-out value (frequency) of such measured tension is input to the host computer to control the quality of the color selecting electrode or the like in the manufacturing process of a cathode ray tube.

The above conventional tension measuring method, however, relies on manual control and input in its process, such as when the resonance point is visually confirmed by an operator and when the value of the read-out frequency of the vibrator is input to the host computer through the user terminal. There are then the disadvantages that the process which relies on a human operator in the manufacturing process of the cathode ray tube cannot be simplified and that the cost of the manufacturing process of the cathode ray tube can not be reduced as is desired.

OBJECTS AND SUMMARY OF THE INVENTION

Accordingly, it is an object of the present invention to provide a method of and apparatus for measuring a tension of grid element in which the aforementioned shortcomings and disadvantages encountered with the prior art can be eliminated.

More specifically, it is an object of the present invention to provide a method of and apparatus for measuring tension of a grid element in which a tension of a measured object can be measured fully automatically with ease.

Another object of the present invention is to provide a method of and apparatus for measuring a tension of grid in which the process for manufacturing a cathode ray tube in a manual fashion can be considerably simplified, such as when a measured object is a grid element constructing a color selecting electrode of a cathode ray tube.

A further object of the present invention is to provide a method of and apparatus for measuring a tension of grid in which the cost of a manufacturing process can be reduced if the present invention is applied to the manufacturing process of a cathode ray tube.

As a first aspect of the present invention, a method of measuring a tension of a grid element is comprised of the steps of vibrating the grid element stretched to a color selecting electrode frame of a color cathode ray tube by the flow of air from an air nozzle, detecting the change of displacement amount of the grid element in the vibration as a waveform signal by the radiation of a laser light emitted from a very small distance measuring device (hereinafter simply referred to as a sensor), feeding the waveform signal back to an electropneumatic regulator coupled to the air nozzle to thereby blow air against the grid element from the air nozzle with a controlled corresponding air pressure of air from the air nozzle, repeating the steps so as to present the condition such that the displacement amount is not substantially changed (i.e., resonance state), and measuring a frequency of the grid element placed in the resonance state per second by using the sensor to thereby obtain a resonance frequency and a tension of the grid element.

According to a second aspect of the present invention, a tension measuring apparatus has an air nozzle, an electropneumatic regulator coupled to the air nozzle for controlling an air pressure of the air nozzle, a very small distance measuring device (sensor) composed of a laser light radiation transmitting unit and a receiving unit for receiving a reflected laser light and a frequency-converting unit having a function to calculate and control a resonance frequency on the basis of a signal from the sensor. The apparatus is comprised of a unit having two slide mechanisms on which at least the air nozzle and the sensor are unitarily attached, wherein the unit can be slidably moved in the x and y directions by the two slide mechanisms. The receiving unit of the sensor is located with an inclination angle from a measuring surface of a measured object relative to the vertical direction. The electropneumatic regulator changes an air pressure in response to a feedback signal from the sensor to allow the air nozzle to vibrate the measured object by the blow of air until the feedback signal from the sensor becomes constant (the measured object is resonated), and the frequency-converting unit calculates, records and converts, if necessary, a resonance frequency into a tension in response to the feedback signal from the sensor.

BRIEF DESCRIPTION OF THE DRAWINGS

A better understanding of other objects, features and advantages of the present invention will be gained from the following detailed description of an illustrative embodiment thereof to be read in conjunction with the accompanying drawings, in which.

DETAILED DESCRIPTION OF THE PREFERRED EMBODIMENT

An embodiment of the present invention will now be described with reference to FIGS. 1 through 11.

Figure 1:
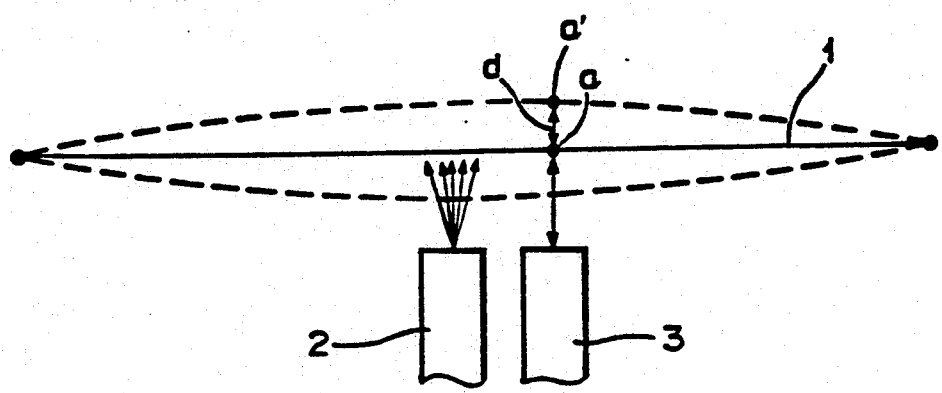
FIG. 1 is a schematic diagram used to explain a principle of a method for measuring a tension according to an embodiment of the present invention.

FIG. 1 shows a principle of the method of measuring a tension according to the embodiment of the present invention.

According to this method of the present invention, as shown in FIG. 1, a measured object 1 of a belt configuration stretched in the longitudinal direction is vibrated by the flow of air from an air nozzle 2 until it is resonated. Then, a displacement amount d of a measuring point a on the measured object 1 to a displaced measuring point a' due to the resonance vibration is measured by means of, for example, the radiation of a laser beam emitted from a very small distance measuring device 3. The thus measured displacement amount d is frequency-converted to calculate a resonance frequency and the calculated resonance frequency is identified as the tension of the measured object 1.

We can identify the resonance frequency as the tension of the measured object on the basis of the following background. That is, as is clear from, for example, the equation of the string transverse vibration expressed as:

$$f(\text{resonance frequency}) = \frac{n}{2l} \sqrt{\frac{Sg}{\gamma}} \quad (1)$$

where l is the length of string, S the tension, $\gamma$ the weight per unit length of the string, g the acceleration of gravity and n the order of vibration. The resonance frequency and the tension are proportional to each other. Therefore, it is to be noted that the tension may be expressed as the resonance frequency so long as a resonance frequency of a reference tension is known.

Figure 2:
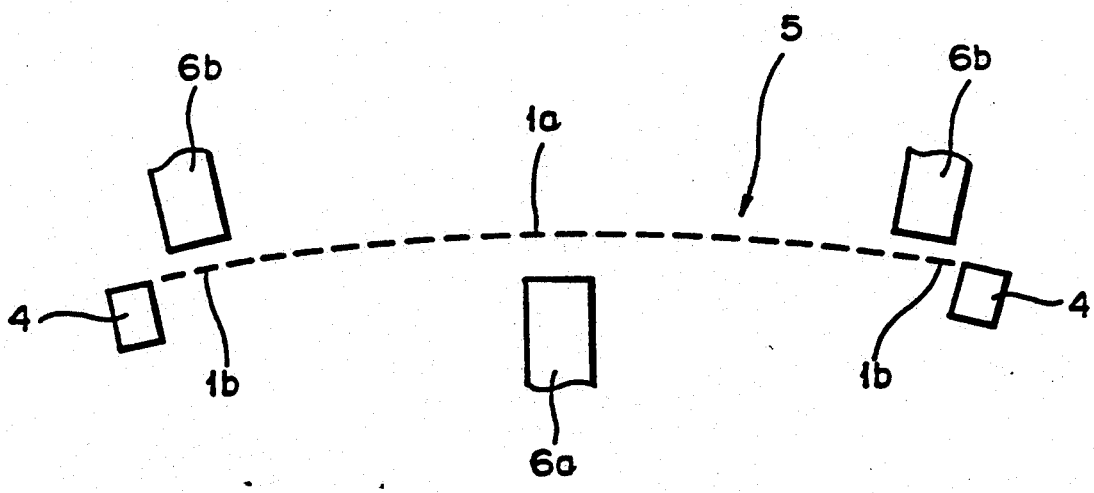
FIG. 2 is a schematic diagram used to explain an example such that the tension measuring method according to the embodiment of the present invention is applied to grid elements constituting a color selecting electrode frame of a cathode ray tube.

Referring to FIG. 2 and the following drawings, the method of measuring a tension according to the embodiment of the present invention will be described, wherein the present invention is applied to the case such that the tension of the grid assembly stretched to the color selecting electrode frame of the cathode ray tube, more precisely, the tension of the grid element constructing the grid assembly is measured.

According to the method of measuring a tension of this embodiment, as shown in FIG. 2, a tension of a grid element 1a at the central portion of a grid assembly 5 stretched to a color selecting electrode frame 4 and a tension of grid elements 1b at the respective two ends of the grid assembly 5 in the longitudinal direction are measured. Measuring units 6a and 6b, 6b are respectively located at these measuring places.

More specifically, a first measuring unit 6a for measuring a tension of the grid element 1a provided at the central portion of the grid assembly 5 is located at the rear side of the central portion of the grid element 1a. Also, second measuring units 6b for measuring a tension of the grid elements 1b, 1b provided at the respective ends of the grid assembly 5 in the longitudinal direction are respectively located at the surface sides of the central portion of the grid elements 1b.

Arrangements and operation of the first and second measuring units 6a and 6b will be described with reference to FIGS. 3 through 11.

Figure 3:
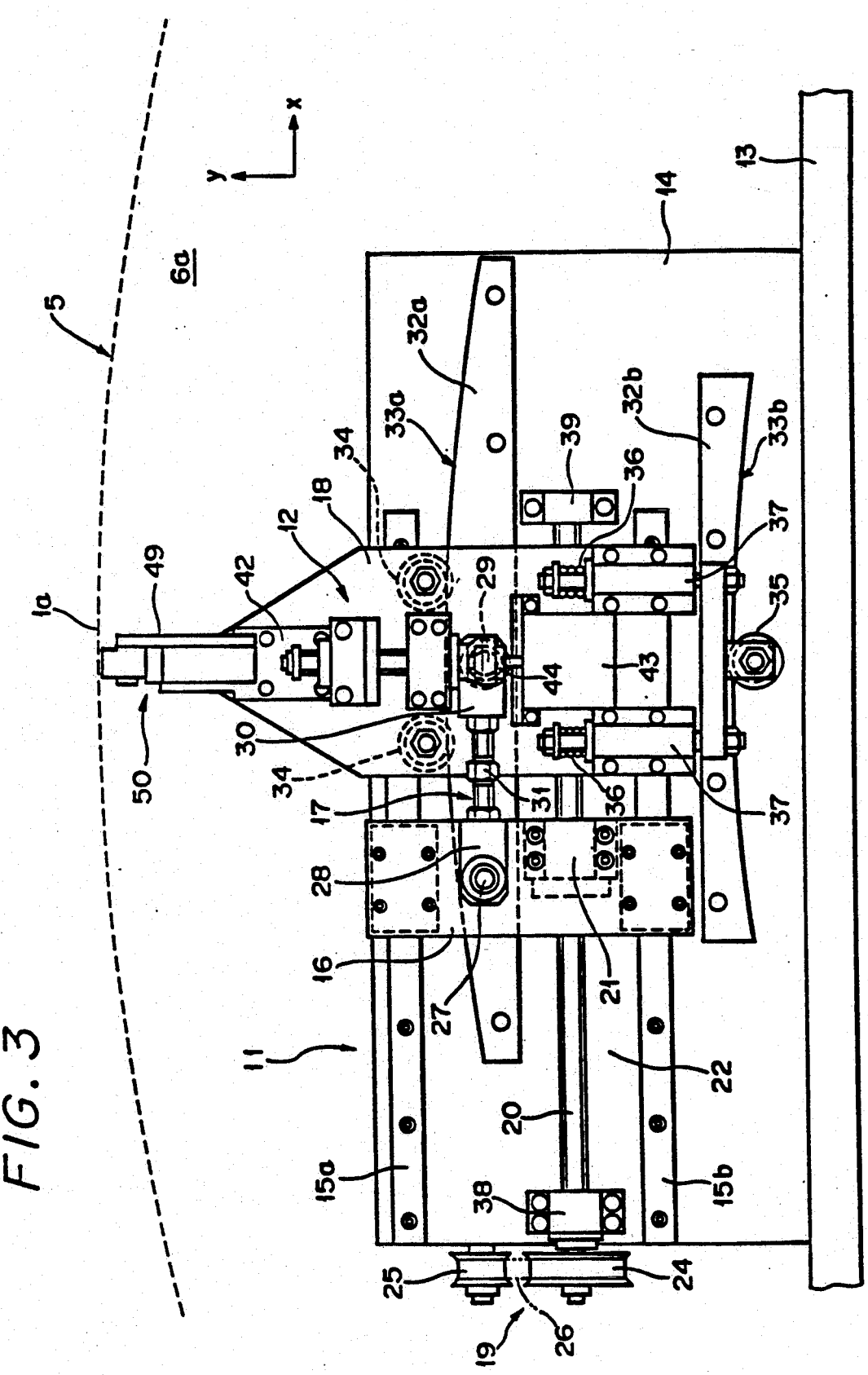
FIG. 3 shows a front view of a first measuring unit according the embodiment of the present invention.

The first measuring unit 6a will be described first. As shown in FIG. 3, the first measuring unit 6a is composed of a first slide mechanism 11 and a second slide mechanism 12. The first slide mechanism 11 is comprised of a slide plate 16 slidably attached to two rails, 15a, 15b secured to a side plate 14 by some suitable means such as screws or the like. The side plate 14 is attached to a base table 13 in the vertical direction and a first slidable plateslidable plate 18 rotatably attached to the the sliding plate 16 by means of a link mechanism 17. The above slide plate 16 is slidably moved along the rails 15a, 15b in the direction shown by an arrow x in FIG. 3 by a feed screw mechanism 22 formed of an external or male thread 20 (whose longitudinal direction is extended in the x direction in FIG. 3) attached to a speed reduction rotating mechanism 19 and a nut 21 meshed with the external thread 20 and which is fastened to the slide plate 16 by some suitable means such as screws or the like.

Figure 4:
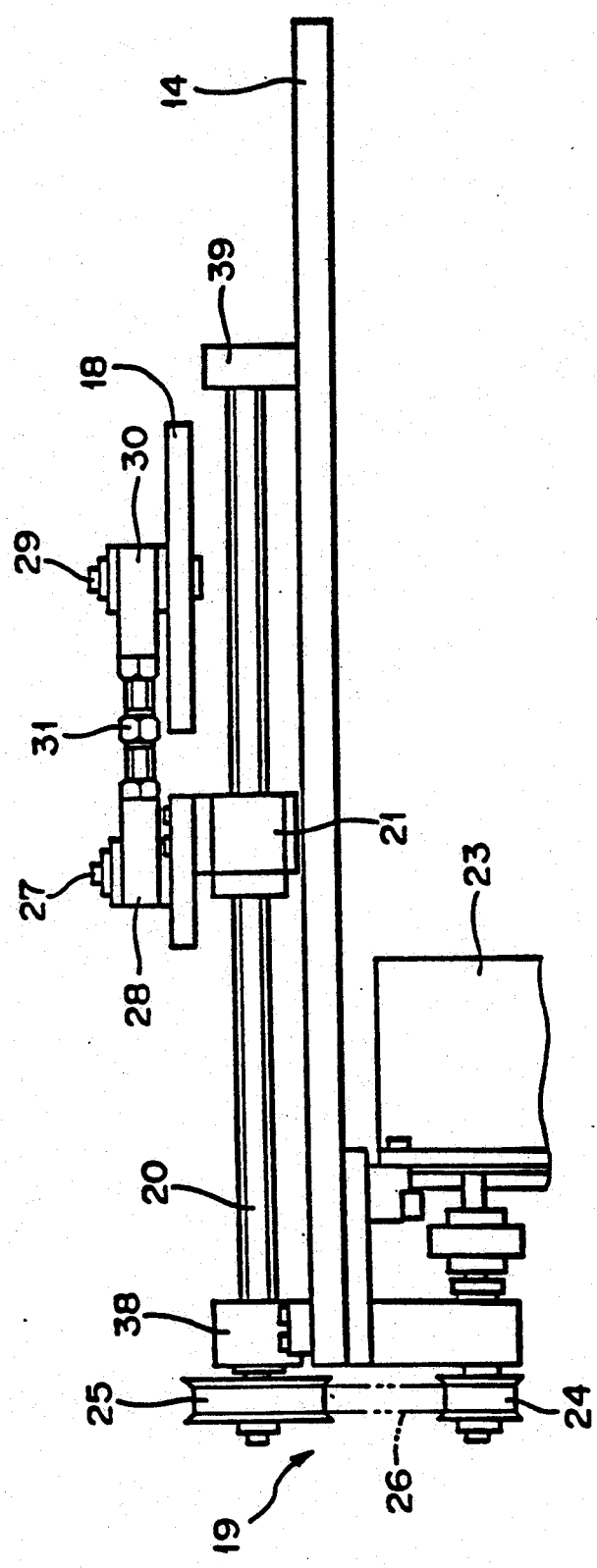
FIG. 4 shows a fragmentary plan view of the first measuring unit of FIG. 3.

As shown in FIG. 4, the speed reduction rotating mechanism 19 is composed of a drive motor 23, a drive pulley 24 secured to the top of the rotary shaft of the drive motor 23 and a follow-up pulley 25 secured to the top of the external thread 20. The speed reduction rotating mechanism 19 serves to rotate the external thread 20 by transmitting the rotation of the drive pulley 24 to the follow-up pulley 25 via a belt 26 (shown by a two-dot chain line). The rotation of the external thread 20 urges the nut 21 to be moved in the axial direction of the external thread 20, thereby slidably moving the sliding plate 16 in the x direction in FIG. 3.

The link mechanism 17 is constructed by coupling a nut 28 rotatably attached to the sliding plate 16 by a shaft 27 and a nut 30 rotatably attached to the first slidable plate 18 by a shaft 29 by means of a bite joint 31, whereby the first slidable plate 18 is made freely rotatable with respect to the shafts 27 and 29.

Also, this first slidable plate 18 is allowed to freely slide along two curvature rails 32a, 32b secured to the side plate 14 by some suitable means such as screws or the like. More specifically, a curvature plane 33a formed on the upper surface portion of the first curvature rail 32a is brought in contact with grooves of V-letter configurations of two rotating plates 34 attached to the first slidable plate 18; and a curvature plane 33b formed on the lower surface portion of the second curvature rail 32b is brought in contact with a groove of V-letter configuration of one rotating plate 35 attached to the first slidable plate 18 (see FIG. 5), whereby the first slidable plate 18 become freely slidable with respect to the first and second curvature rails 32a, 32b.

Particularly, since the rotating plate 35 is constantly spring-biased in the upper direction by means of a spring 36 and a cylinder 37, the first curvature rail 32a is pushed downward by the two rotating plates 34, while the second curvature rail 32b is pushed upward by the rotating plate 35. The curvature planes 33a and 33b of the first and second curvature rails 32a and 32b are both substantially the same in radius of curvature and this radius of curvature is substantially the same as that of the grid assembly 5.

Thus, when the sliding plate 16 of the first sliding mechanism 11 is slidably moved in the x direction in FIG. 3, then the first slidable plate 18 is slidably moved in the x direction while being moved up and down along the curvatures of the curvature rails 32a and 32b by a very small amount.

Figure 5:
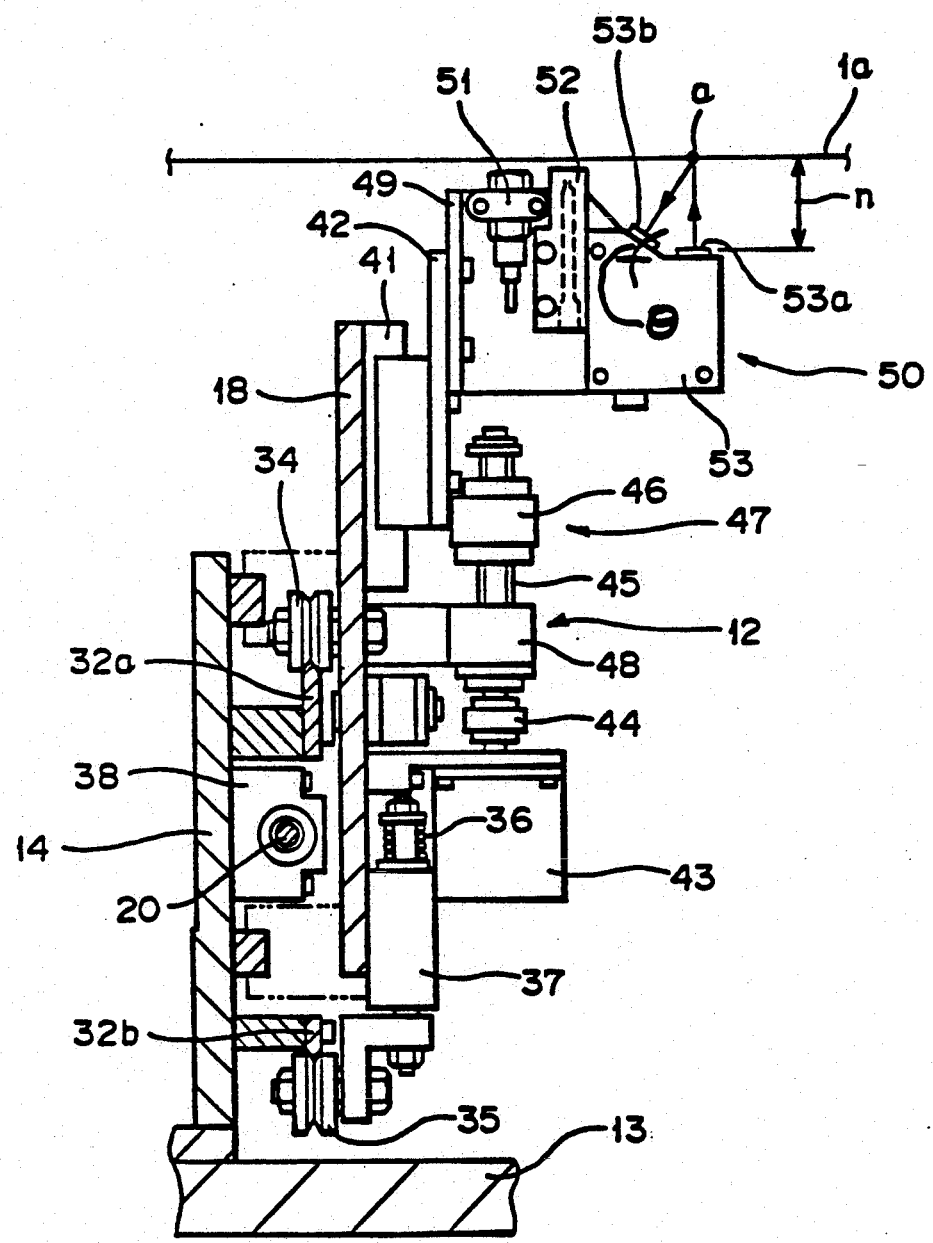
FIG. 5 shows a cross-sectional side view of the first measuring unit of FIG. 3.

In FIGS. 3 to 5, reference numerals 38, 39 depict roller bearings which also serve to support the external thread 20 relative to the side plate 14.

The second slide mechanism 12 includes a second slidable plate 42 which is slidably attached to a rail 41 (see FIG. 5) attached to the first slidable plate 18. The second slidable plate 42 is slidably moved in the y direction in FIG. 3 by means of a feed screw mechanism 47 which is composed of an external or male thread 45 coupled to the rotating shaft of a drive motor 43 secured to the first slidable plate 18 by screws or the like and a nut 46 secured to the second slidable plate 42 by screws or the like. In FIG. 5, reference numeral 48 depicts a roll bearing which serves to support the external thread 45 to the first slidable plate 18.

In the first measuring unit 6a according to the embodiment of the present invention, a tension measuring device 50 is provided on the upper portion of the second slidable plate 42, that is, the tension measuring device 50 is mounted on an L-shaped plate 49 secured to the second slidable plate 42 by screws or the like.

As shown in FIG. 5, the tension measuring device 50 is comprised of a contactless switch 51, an air-nozzle 52 and a very small distance measuring device or sensor 53 for measuring a distance by the radiation of a laser light. The sensor 53 is composed of a transmitting unit 53a and a receiving unit 53b. In the layout of the contactless switch 51, the air nozzle 52 and the sensor 53, these elements are disposed in this sequential order and the transmitting unit 53a of the sensor 53 is located at the outermost position (in the right end of FIG. 5). Particularly, the receiving unit 53b of the sensor 53 is disposed above the transmitting unit 53a so as to have an inclination of an angle θ (=about 30 degrees) relative to the horizontal as shown in FIG. 5.

When a tension of the central portion of the central grid element 1a of the grid assembly 5 stretched in the color selecting electrode frame is measured by using the first measuring unit 6a, the first slidable plate 18 is slidably moved in the x direction by the first sliding mechanism 11 to thereby locate the tension measuring device 50 at the central portion of the rear surface of the grid element 1a. Then, the second slidable member 42 is slidably moved in the upper direction to bring the tension measuring device 50 near the grid element 1a. When the distance n between the transmitting unit 53a of the sensor 53 and the grid element 1a reaches about 40 mm, then the contactless switch 51 is energized (e.g., turned on) to stop the operation of the second sliding mechanism 12.

Then, the grid element 1a is vibrated by the flow of air from the air nozzle 52 and the grid element 1a is thereby vibrated and then resonated. The change of the displacement amount d (see FIG. 1) at the measuring point a of the grid element 1a due to the resonance of the grid element 1a is measured by the sensor 53, and this change of the displacement amount d is converted into a frequency (resonance frequency) by a signal processing system of the succeeding stage.

Figure 6A:
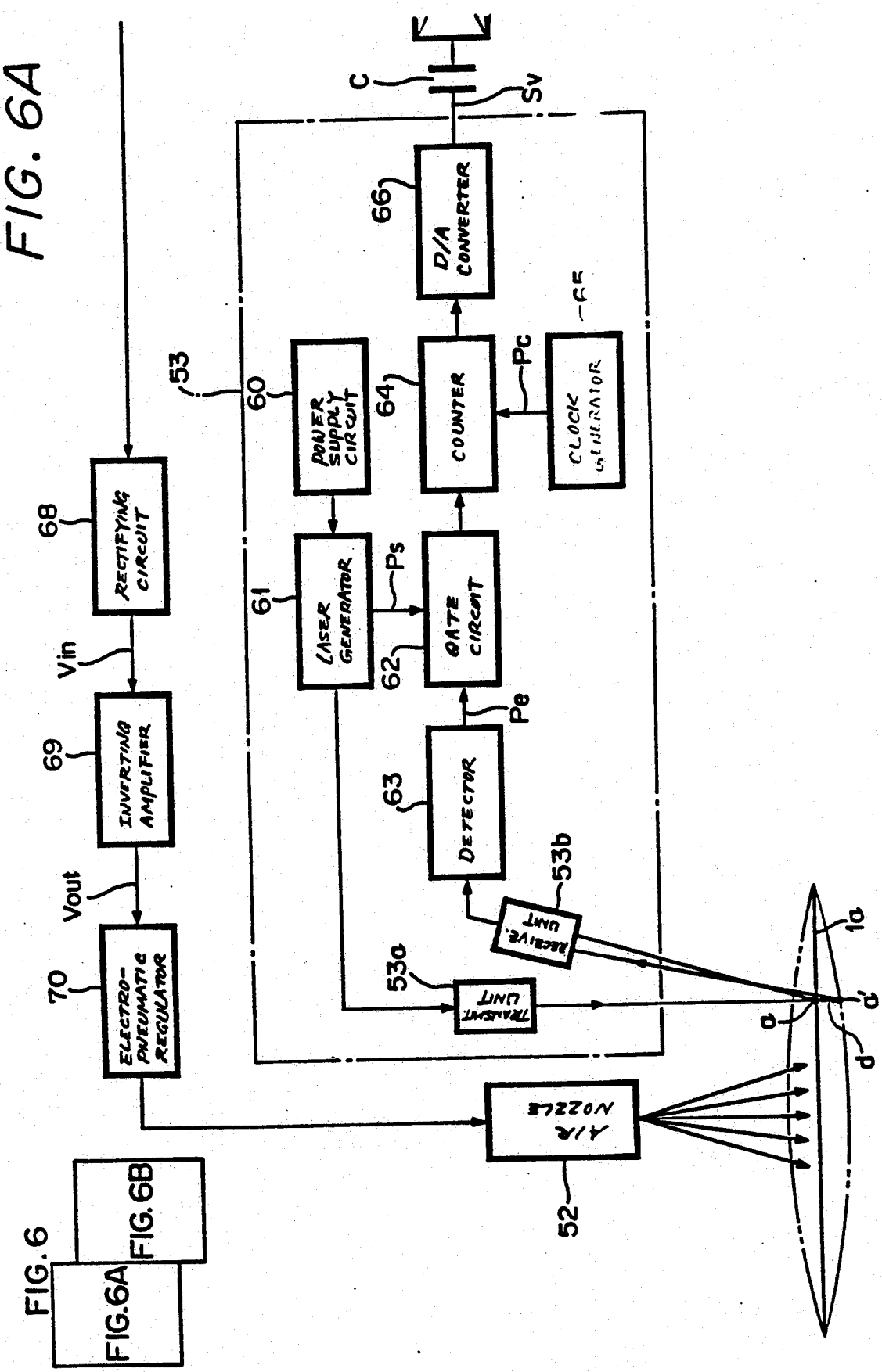
FIG. 6, which is formed of FIGS. 6A and 6B drawn on two sheets of drawings so as to permit the use of a suitably large scale, is a block diagram showing a signal processing circuit for obtaining a resonance frequency according to the embodiment of the present invention.
Figure 6B:
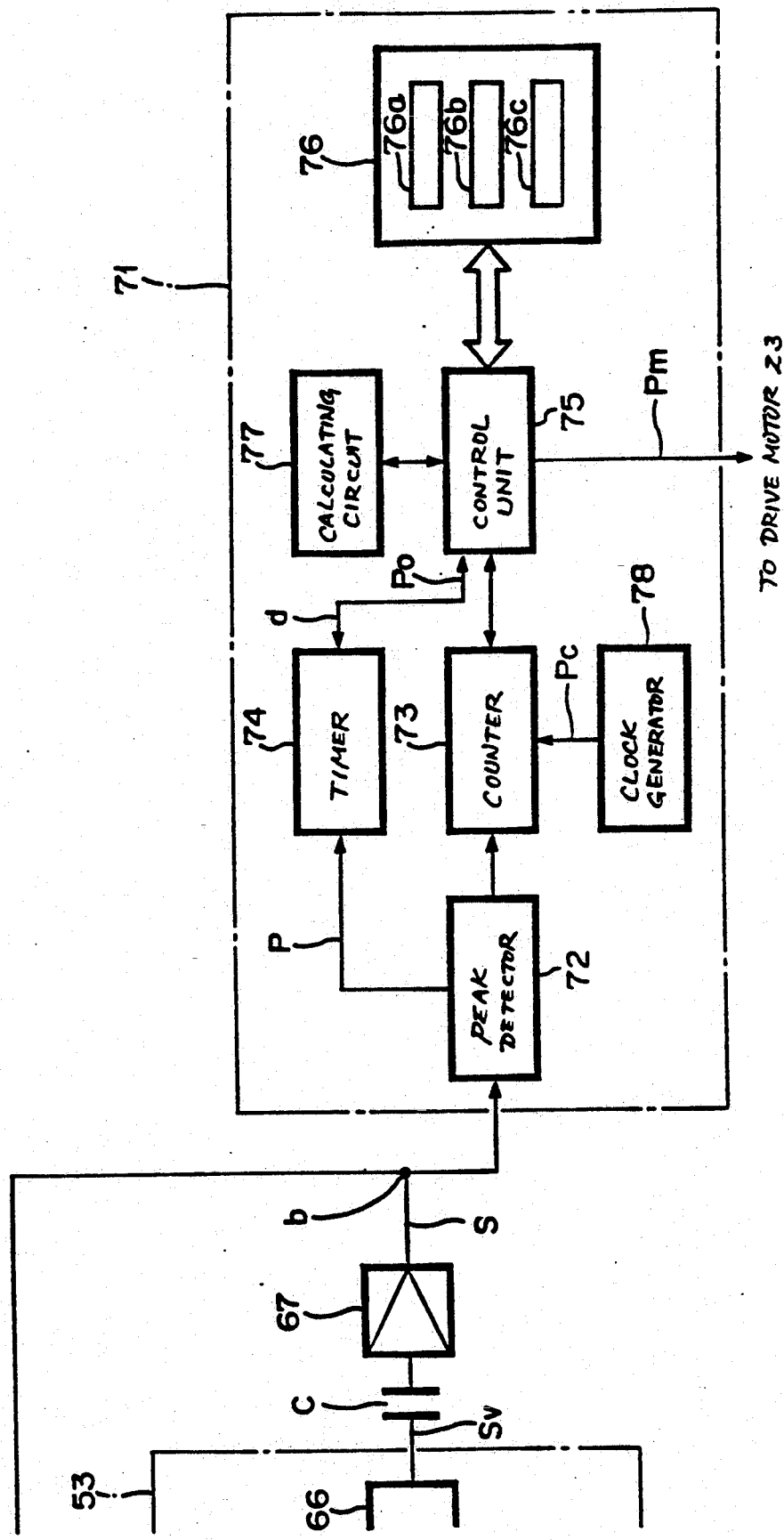

Referring to FIGS. 6A and 6B (drawn on two sheets of drawings so as to permit the use of a suitably large scale), these figures describe the signal processing in which the grid element 1a is resonated and its resultant resonance frequency is obtained.

As described above, referring to FIG. 6, when the contactless switch 51 see FIG. 5) is turned on, a laser generator 61 is energized by a power supply circuit 60 and a pulse laser light is emitted from the transmitting unit 53a through the laser generator 61. At that time, a gate circuit 62 on the receiving unit 53b side is opened by a start pulse Ps from the laser generator 61. Thereafter, the laser light reflected on the measuring point a on the grid element 1a becomes incident on the receiving unit 53b and enters a detector 63. This received pulse is amplified by the detector 63 as a stop pulse Pe to close the gate circuit 62. Then, the number of clock pulses Pc from the clock generator 65, which are counted by a counter 64 during the period which gate circuit 62 is opened, is converted into, for example, a voltage by a digital-to-analog (D/A) converter 66. At that time, since the grid element 1a is not yet subjected to the flow of air, the D/A converter 66 derives only the DC component indicative of the distance between the transmitting unit 53a and the receiving unit 53b in which the measuring point a on the grid element 1a before being vibrated is taken as an intermediate point. This DC component is removed by a coupling capacitor C and zero level is supplied through an amplifier 67, a contact b and a rectifying circuit 68 to an inverting amplifier 69. This inverting amplifier 69 has input and output characteristics shown in FIG. 7 so that, when the input voltage Vin from the rectifying circuit 68 is at zero level, then its output voltage Vout is maximized and that, when the input voltage Vin is high in amplitude, the smaller its output voltage Vout becomes. In this case, since the input voltage Vin is at zero level, then the maximum output voltage Vout is produced from the inverting amplifier 69 and supplied to the electropneumatic regulator 70 of the next stage.

This electropneumatic regulator 70 is adapted to adjust the pressure of air from the air nozzle 52 such that the above pressure becomes proportional to the output voltage Vout of the inverting amplifier 69. A relation between the input voltage Vin to the inverting amplifier 69 from the rectifying circuit 68 and the output (air pressure) from the electropneumatic regulator 70 becomes substantially the same as the input and output characteristics of the inverting amplifier 69 of FIG. 7 (see FIG. 8).

In the above embodiment, since the maximum voltage Vout from the inverting amplifier 69 is input to the electropneumatic regulator 70, air of maximum pressure is produced from the air nozzle 52 and blown to the grid element 1a, causing the grid element 1a to be vibrated.

The laser light is emitted from the transmitting unit 53a intermittently at the very short output timing so that, when the grid element 1a is vibrated and its measuring point a is displaced in the vertical direction, then the change of the displacement amount d of the measuring point a is output from the D/A converter 66 as a waveform signal Sv. This waveform signal Sv is supplied to the coupling capacitor C, in which it is removed in DC component and then amplified by the amplifier 67. The thus amplified waveform signal S is supplied through the contact b to the above rectifying circuit 68 and a frequency converting unit 71 which will be described later.

Figure 7:
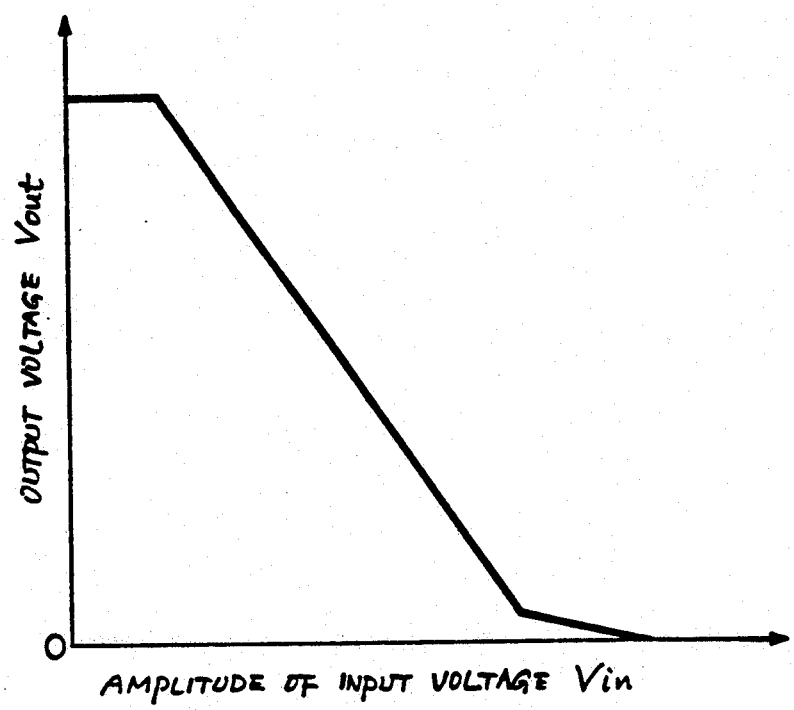
FIG. 7 shows a characteristic graph of input and output characteristics of an inverting amplifier according to the embodiment of the present invention.
Figure 8:
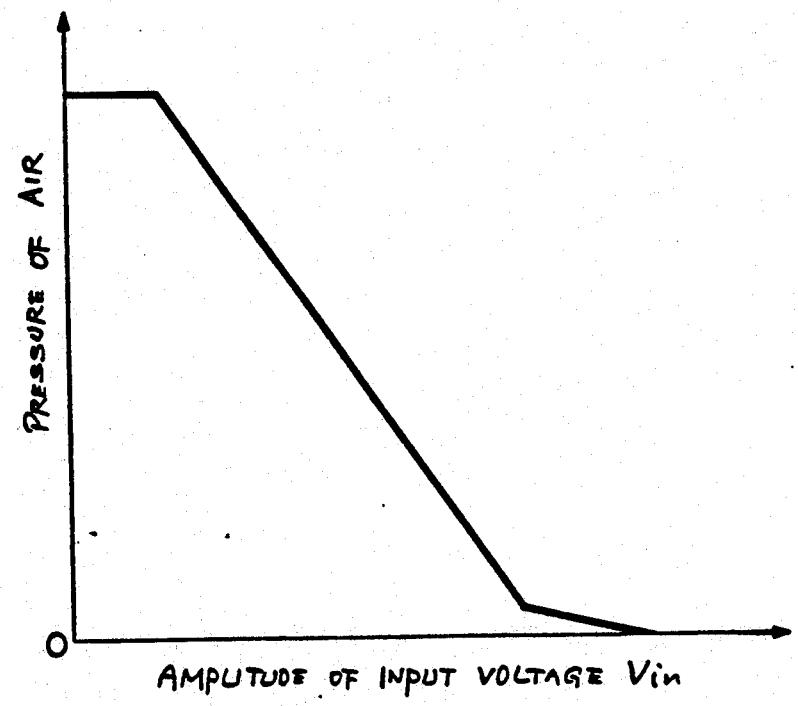
FIG. 8 shows a characteristic graph of input and output characteristics of an electropneumatic regulator according to the present invention.

The waveform signal S supplied to the rectifying circuit 68 is converted into a DC signal (input voltage) Vin and then fed to the inverting amplifier 69, from which there is derived an output voltage Vout corresponding to the input and output characteristics of FIG. 7. This output voltage Vout is supplied to the electropneumatic regulator 70 which supplies an air pressure corresponding to the output voltage Vout to the grid element 1a by means of the air nozzle 52.

The feedback control from the sensor 53 to the electropneumatic regulator 70 is employed to resonate the grid element 1a. That is, the vibration of the grid element 1a is unstable until it is resonated so that, if the grid element 1a is vibrated with a large amplitude, the air pressure is reduced, while if the grid element 1a is vibrated with a small amplitude, the air pressure is increased, whereby the grid element 1a is resonated finally. When the grid element 1a is resonated, then the peak of the waveform signal S becomes constant, that is, the amplitude of the DC signal (input voltage) Vin from the rectifying circuit 68 becomes constant and also the air pressure from the air nozzle 52 becomes constant.

The frequency converting unit 71 is composed of a peak detecting circuit 72 which detects the peak of the waveform signal S supplied from the amplifier 67, and a counter 73 which counts the number of such peaks. An example of operation of the frequency converting unit 71 will be described. When the grid element 1a is vibrated by the air pressure and the waveform signal S generated by the vibration of the grid element 1a is supplied to the peak detecting circuit 72, then the peak detecting circuit 72 detects the first peak and simultaneously, supplies a set pulse P to a timer 74. The timer 74 supplies an interrupt signal P0 to a control unit 75 with the lapse of time of, for example, 1 second after the set pulse P is input.

The control unit 75 reads out the number of peaks counted by the counter 73 during one second on the basis of the interrupt signal P0 and stores the same in a first array variable region 76a within a memory 76 and also resets the counter 73. More preferably, the control unit 75 transmits a set pulse input standby instruction d to the timer 74 as an inter-lock means. Then, the timer 74 is placed in the set pulse input standby state from the peak detecting circuit 72 on the basis of the instruction d.

By repeating a series of the above operation three times, that is, after the elapse of three seconds, the number of peaks of the waveform signal S supplied from the amplifier 67 per second each is stored in the first to third array variable regions 76a to 76c within the memory 76.

Then, a calculating unit 77 calculates and compares number data of the respective array variable regions 76a to 76c. If the number data are substantially the same, for example, if the number data are the same, or different only in 1 to 3 peaks, then it is determined that the grid element 1a is resonated, and the average value of, for example, three number data is selected as a resonance frequency f. If the grid element 1a is not resonated, the number data are considerably different. Accordingly, it can easily determine by the above calculation method in the calculating unit 77 whether or not the grid element 1a is resonated.

In order to determine with higher accuracy whether or not the grid element 1a is resonated, a clock generator circuit 78 is connected, for example, to the counter 73 and the number of clock pulses Pc between the peaks is counted by the counter 73. In this case, if the numbers of clock pulses Pc between the peaks are substantially the same and if the numbers of the peaks are substantially the same, then it may be determined that the grid element 1a is resonated.

The resonance frequency f calculated in the frequency converting unit 71 is supplied to the calculating unit 77, in which it is determined whether or not it is incorrect data. If it is the incorrect data, then a message indicative of incorrect data is displayed on a monitor screen (not shown) or an alarm sound is emanated from a speaker (not shown) of a computer which concentratedly administers the manufacturing process of the cathode ray tube in a central supervisory room or the like such that the operator may realize the occurrence of the incorrect data. In this case, the color selecting electrode so recognized as a failure must be assembled one more time or discarded. If on the other hand it is determined that the resonance frequency f is correct data, then such correct data is registered in a memory (administration data file) of the computer as one of quality data of the color selecting electrode, which becomes one of the elements for quality control and history control.

If the measuring point of the tension measuring device 50 is displaced from the measuring point a on the grid element 1a by about half pitch when the first slidable plate 18 is slidably moved by the first slide mechanism 11, then the grid element 1a to be measured cannot be resonated because most of the air escapes from a slit 81 between the grid elements 1a, even though the tension measuring device 50 is located near the grid element 1a to measure the tension of the grid element 1a.

To remove the above defects, in this embodiment, the number in which the calculating unit 77 performs the calculation to obtain the above resonance frequency f is limited. For example, if the resonance frequency f is not obtained even by the calculation of 10 to 20 times, then it is determined that the measuring point of the tension measuring device 50 is displaced from the above measuring point a in the grid element 1a by half pitch, and a drive pulse Pm is supplied from the control unit 75 to the drive motor 23.

Figure 9:
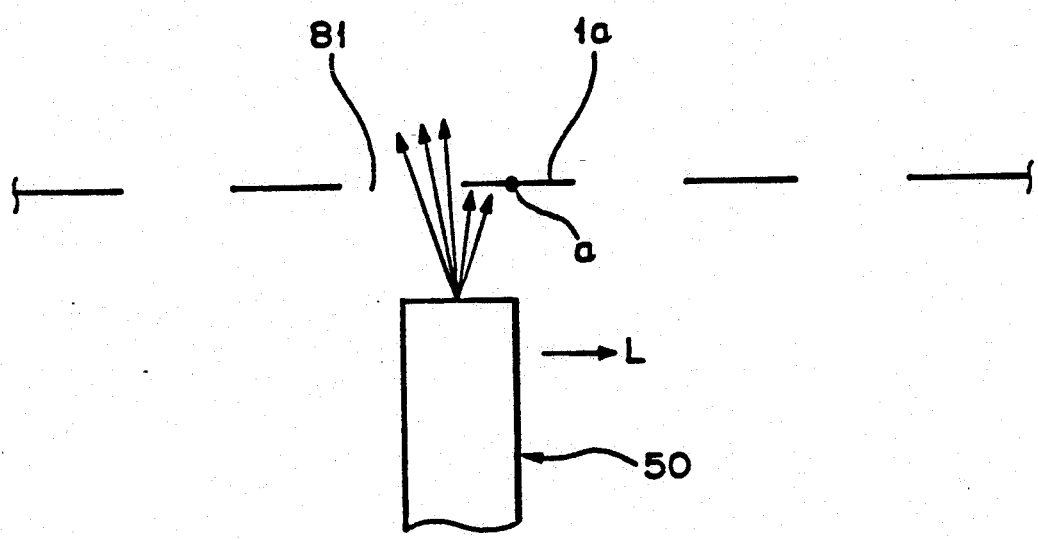
FIG. 9 is a schematic diagram used to explain other action of a first slide mechanism according to the embodiment of the present invention.

The drive motor 23 is driven in response to the input of the drive pulse Pm to thereby slide the first slidable plate 18 by half pitch in the left and right direction (in the direction shown by an arrow L in FIG. 9). At that time, since the first slidable plate 18 is slidably moved along the curvature rails 32a, 32b, a distance n between the grid element 1a and the transmitting unit 53a of the tension measuring device 50, for example, can be kept constant. Accordingly, it is possible to avoid an unexpected accident such that a part of the tension measuring device 50 collides with another grid element to damage the grid element and the tension measuring device 50.

Further, since the tension measuring device 50 is slid by half pitch such that the measuring point of the tension measuring device 50 and the measuring point a of the grid element become coincident with each other, it is possible to prevent a kind of endless loop phenomenon in which the resonance frequency f cannot be obtained by the calculating unit 77 forever.

Figure 10:
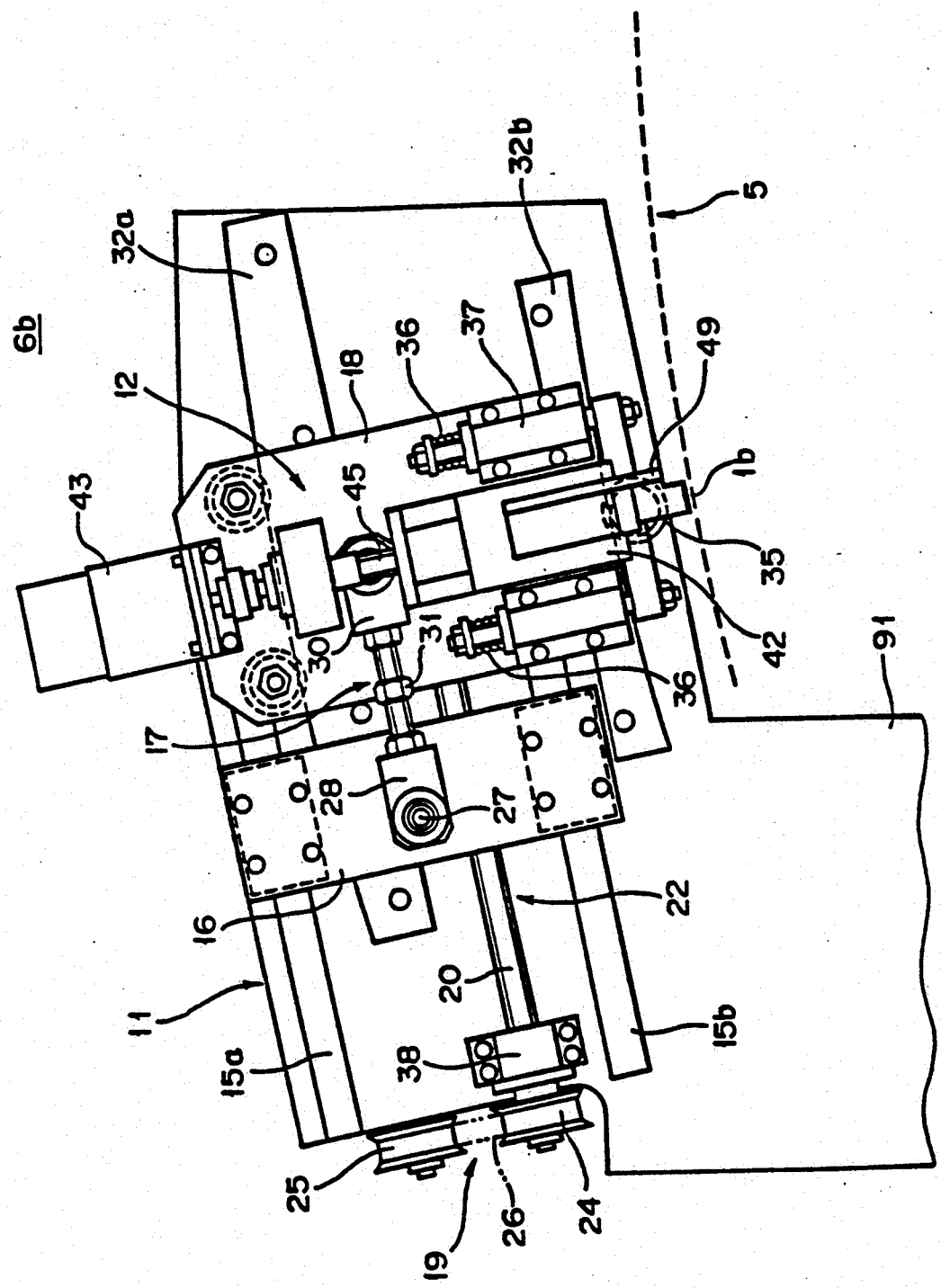
FIG. 10 shows, a front view of a second measuring unit according to the embodiment of the present invention.
Figure 11:
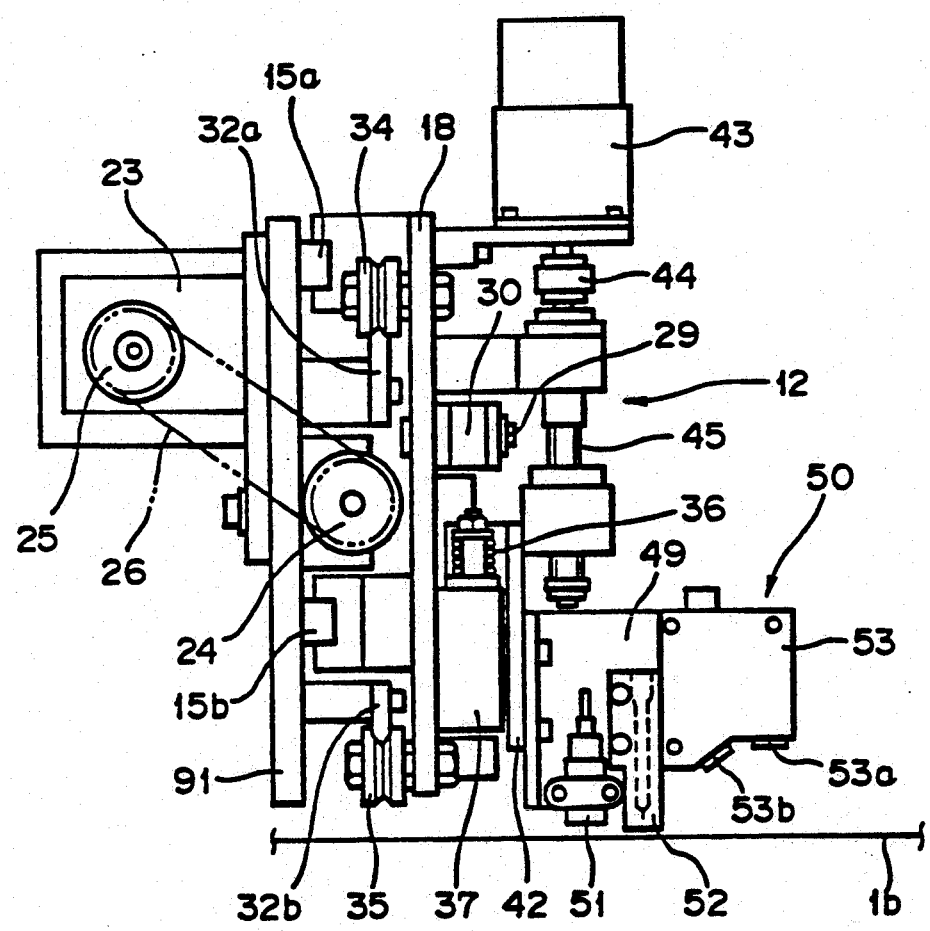
FIG. 11 shows a side view of the second measuring unit of FIG. 10.

The second measuring unit 6b will be described with reference to FIGS. 10 and 11.

The second measuring unit 6b is arranged in substantially the same manner as that of the first measuring unit 6a. The second measuring unit 6b is different from the first measuring unit 6a only in that the second measuring unit 6b is attached to an arm 91 extended along the tangent direction in the measuring point at the end portion of the grid element 1b and that the tension measuring device 50 of the second measuring unit 6b is attached to be directed downward. Accordingly, in FIGS. 10 and 11, like parts corresponding to those of FIGS. 3 to 5 are marked with the same references and therefore the arrangement and operation thereof need not be described in detail.

As described above, according to this embodiment, the grid element 1a is vibrated, for example, by the flow of air, then the the grid element 1a is resonated by the feedback control mechanism formed of the sensor 53, the amplifier 67, the rectifying circuit 68, the inverting amplifier 69 and the electropneumatic regulator 70. The waveform signal S accompanying such resonance is read out by the frequency converting unit 71 to thereby obtain the frequency (resonance frequency) f of the above waveform signal S. Then, this resonance frequency f is identified as the tension of the grid element 1a. Therefore, the tension of the grid element 1a can be measured fully automatically and the process for manufacturing the cathode ray tube in a manual fashion can be reduced and the number of the manufacturing process can be reduced.

While the tension of the grid elements 1a and 1b of the color selecting electrode of one kind is measured as described above, according to this embodiment, the distance between the transmitting unit 53a and the grid element 1a or 1b is kept constant by the contactless switch 51 so that, even when the size of the color selecting electrode and the curvature of the grid assembly 5 are changed depending on the kind of the cathode ray tubes, the tension of the grid elements 1a and 1b can be measured. Therefore, the present invention can be applied to various kinds of the cathode ray tubes.

While the tension of the grid element is measured in the above-mentioned embodiment, tension of other objects can be measured so long as the measured objects have band-shaped configurations.

According to the tension measuring method of the present invention, the tension of the measured object can be measured fully automatically with ease. For example, if the measured object is the grid element constructing the color selecting electrode of a cathode ray tube, then the processing for manufacturing the cathode ray tube in a manual fashion can be simplified and reduced and the cost of the manufacturing process can be reduced.

Having described the preferred embodiment of the invention with reference to the accompanying drawings, it is to be understood that the invention is not limited to those precise embodiment and that various changes and modifications thereof could be effected by one skilled in the art without departing from the spirit or scope of the invention as defined in the appended claims.

We claim as our invention:

1. A method of measuring a tension of a grid element stretched to a color selecting electrode frame of a color cathode ray tube comprising the steps of: vibrating said grid element by the flow of air from an air nozzle so that said grid element is resonated;

counting the number of vibrations of said grid element per second by the radiation of a laser light emitted from a very small distance measuring device; and calculating a resonance frequency of said grid element from the number of said vibrations to thereby obtain a tension of said grid element.

2. A method of measuring a tension of a grid element stretched to a color selecting electrode frame of a color cathode ray tube, comprising the steps of:
(a) vibrating said grid element by the flow of air from an air nozzle;
(b) detecting the change of displacement amount of said grid element in the vibration as a waveform signal by the radiation of a laser light emitted from a very small distance measuring device;
(c) feeding said waveform signal back to an electropneumatic regulator coupled to said air nozzle to thereby blow air against said grid element from said air nozzle at an air pressure proportional to peak amplitudes in said waveform signal;
(d) repeating said steps (b) and (c) until a resonance state is determined wherein the displacement amount is not substantially changed from the previous iteration of steps (b); and
(e) calculating a frequency of said resonance state by using said very small distance measuring device to thereby obtain a resonance frequency and thereby a tension of said grid element.

3. A tension measuring apparatus for an object to be measured, said object being held between two points under tension, defining a length therebetween, comprising: an air nozzle, an electropneumatic regulator coupled to said air nozzle for controlling an air pressure of said air nozzle to control the velocity of air exiting the nozzle, a very small distance measuring device composed of a laser light radiation transmitting unit and a receiving unit for receiving a reflected laser light and a frequency-converting unit having a function to calculate and control a resonance frequency on the basis of a signal from said very small distance measuring device, wherein said apparatus is configured as a unit having two slide mechanisms on which at least said air nozzle and said measuring device are unitarily attached, wherein said unit can be slidably moved toward and away from said object in a first direction that is perpendicular to said length and in a lateral direction with respect to said length that is perpendicular to the first direction by said two slide mechanisms respectively, said receiving unit of said measuring device is located with an inclination angle from a measuring surface of said object to be measured relative to the perpendicular direction to said length, said electropneumatic regulator changes an air pressure in response to a feedback signal from said measuring device to allow said air nozzle to vibrate said measured object by the flow of air until said feedback signal from said measuring device becomes constant when said object to be measured is resonated, and said frequency-converting unit calculates a resonance frequency in response to said feedback signal from said measuring device to thereby obtain the tension of said object.

4. A method according to claim 2 comprising the further steps of:

laterally moving said very small distance measuring device to a central portion of a span of said grid element;

translating said very small distance measuring device toward said grid element until a preselected distance is achieved as measured by said very small distance measuring device.

5. A method according to claim 2, wherein said step of detecting the change of displacement comprises the steps of detecting peak amplitudes in said waveform signal and counting said peak amplitudes over a plurality of incremental time periods; and storing a number of peak amplitudes for each time period in a plurality of array variable regions within a memory;

comparing the number of peak amplitudes in said array variable regions; and if the respective number of peak amplitudes stored in said variable array regions are substantially the same, the resonant state is considered reached; and calculating an average resonant frequency for each grid element by summing the number of peak amplitudes of each of the plurality of incremental time periods and dividing by a sum of the plurality of incremental time periods.

6. A method according to claim 5, wherein said step of repeating steps (b) and (c) is further characterized in that after a maximum selected number of incremental time periods, laterally moving said air nozzle a small distance with respect to said grid element.

7. A method according to claim 6, wherein said air nozzle is moved one-half pitch of said grid element.

8. A tension measuring apparatus for an object, said object being held between two points under tension defining a length, comprising:

an air nozzle;

an electropneumatic regulator coupled to said air nozzle for controlling air velocity exiting said air nozzle;

a very small distance measuring device including a laser light radiation transmitting unit and a receiving unit for receiving a reflected laser light and determining displacement of said object;

a frequency determining means for calculating and controlling a resonance frequency on the basis of a feedback signal from said very small distance measuring device;

said electropneumatic regulator adapted to change an air pressure supply to said nozzle in response to a feedback signal from said measuring device until said feedback signal from said measuring device becomes constant when said object to be measured is resonated by the flow of air exiting said nozzle, and said frequency determining means calculates a resonance frequency in response to said feedback signal from said measuring device to thereby obtain the tension of said object;

wherein said apparatus is configured as a unit having two slide mechanisms on which at least said air nozzle and said measuring device are unitarily attached, wherein said unit can be slidably moved in a lateral direction with respect to a direction of said length and said unit can also be slidably moved in a first direction toward and away from said object, said first direction perpendicular to said length, said lateral direction perpendicular to said first direction by said two slide mechanisms respectively.

9. A tension measuring apparatus according to claim 8, wherein said two slide mechanisms comprise a first slide mechanism arranged on an arcuate track compatible with a curvature of said object, and a second slide mechanism itself movable along said arcuate track and extendable to and away from said object.

10. A tension measuring apparatus according to claim 9 further comprising a slide plate slidable linearly and laterally with respect to said object along at least one straight track, said slide plate providing a pivotable link attached thereto and to said first slide mechanism; and a drive means for selectively translating said slide plate along said straight track.

11. A tension measuring apparatus for an object, said object being held between two points under tension, defining a length, comprising:

an air nozzle;

an electropneumatic regulator coupled to said air nozzle for controlling air velocity exiting said air nozzle;

a very small distance measuring device including a laser light radiation transmitting unit and a receiving unit for receiving a reflected laser light and determining displacement of said object;

a frequency determining means for calculating and controlling a resonance frequency on the basis of a feedback signal from said very small distance measuring device;

said electropneumatic regulator adapted to change an air pressure supply to said nozzle in response to a feedback signal from said measuring device until said feedback signal from said measuring device becomes constant when said object to be measured is resonated by the flow of air exiting said nozzle, and said frequency determining means calculates a resonance frequency in response to said feedback signal from said measuring device to thereby obtain the tension of said object;

wherein said receiving unit of said measuring device is located with an inclination angle from a measuring surface of said object relative to a direction that is from said object that is perpendicular to said length.

12. A tension measuring apparatus according to claim 11, wherein said very small distance measuring device is adapted to provide a displacement waveform signal of said object; and wherein said frequency determining means comprises a counter means for counting amplitude peaks in said displacement waveform signal;

a clock means for segregating a plurality of sample periods; and a memory means for storing a respective number of amplitude peaks for each sample period in a separate region respectively; and a means for comparing the number of amplitude peaks stored in each region and for indicating that the number of amplitude peaks stored in said regions are substantially the same.

13. A tension measuring apparatus according to claim 11, wherein said measuring device is adapted to produced an increasing feedback signal to said electropneumatic regulator upon decreasing displacement amplitudes, and a decreasing feedback signal upon increasing displacement amplitudes, said electropneumatic regulator varying said air pressure to said nozzle according to the magnitude of said feedback signal.

* * * * *